(No Model.)
F. W. HUESTIS.
BICYCLE TIRE.
No. 508,943. Patented Nov. 21, 1893.
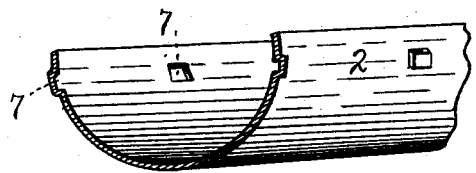
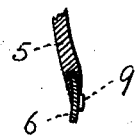
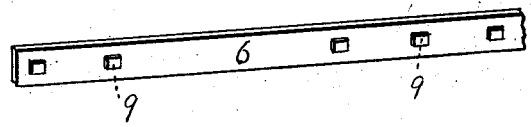
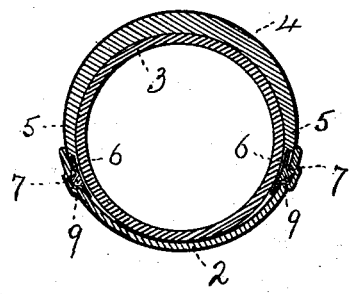
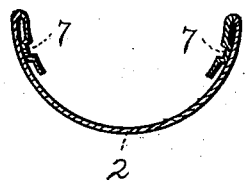
Witnesses.
Francis C. Stanwood
Fred C. Blossom.
Inventor.
Fred'k W. Huestis.
by H. E. Lodge Atty.

UNITED STATES PATENT OFFICE.

FREDERICK W. HUESTIS, OF BOSTON, ASSIGNOR TO GEORGE E. CRAFTS, OF NEWTON, MASSACHUSETTS.

BICYCLE-TIRE.

SPECIFICATION forming part of Letters Patent No. 508,943, dated November 21, 1893.

Application filed May 29, 1893. Serial No. 476,000. (No model.)

*To all whom it may concern:*

Be it known that I, FREDERICK W. HUESTIS, a citizen of the United States, residing at Boston, in the county of Suffolk and State of Massachusetts, have invented certain new and useful Improvements in Bicycle-Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in the construction of pneumatic tires for bicycles, particularly that class in which a rim, an air tube, and an outer cover or envelope are employed, the latter being provided with metallic rings or bands longitudinally along its edges and by means of which the envelope is secured to the rim in order to protect the air tube.

This invention relates to the peculiar formation of the rim and the rings, which are arranged to interlock in a positive manner. The engagement is produced through the tendency of the air tube to expand under pressure. The peculiar feature consists in creating a series of depressions upon the rim on the concave portion or that part which serves as a seat for the air tube. The metal of the rim is not broken but displaced, as shown, while the rings or bands are similarly formed and the prominences or knobs upon one side of the rings are to engage the depressions in the rim.

The drawings represent in Figure 1 a sectional elevation of a rim of a bicycle embodying my invention. Fig. 2 is a perspective of a portion of one of the rings. Fig. 3 is a section showing attachment of ring with the cover. Fig. 4 is a cross-section of a complete tire under my invention. Fig. 5 is a modified form of rim, likewise under my invention.

In said drawings 2. represents a rim of a bicycle equipped with a pneumatic tire; the air-tube is shown at 3 and the outer envelope or cover at 4. Longitudinally of the cover and along its edges 5. 5. are attached metallic strips in the form of rings 6. 6. which serve to engage the rim and thus interlock these two parts and so inclose the air tube.

To carry out my invention I propose to roll, press, stamp or otherwise create certain recesses or depressions 7 7 at intervals in the rim in corresponding portions and preferably near the edges thereof. In creating these depressions the metal is simply displaced and generally not cut through thus creating prominences or knobs upon the inner or convex circumference of the rim. Similarly a series of prominences 9 are created in the rings or metallic strips and said projections are spaced so as to coincide with the depressions in the rim. These may be created at intervals or a regular spacing may be made throughout the entire circumference.

In the use of pneumatic tires one objectionable feature, termed "creeping," takes place with the air-tube. This is occasioned by the rotation of the wheel, and the fact that the air-tube is fastened only at one point, while in many instances the outer cover or envelope is free to slip around the rim, and a pull or strain is produced upon the material of the air-tube. This action which occurs at each revolution of the wheel may be instanced to that effected by pulling a piece of rubber, which fastened to a fixed point, gradually is weakened and in the air-tube this is followed by rupture and collapse.

In the tire under my invention it will be noticed that the outer envelope has positive mechanical attachment to the rim, and inasmuch as the air tube is held fast to the rim by means of the air valve (not shown) it is evident that no creeping can possibly take place since the envelope is secured firmly to the rim. Furthermore the rim does not require to be of any particular shape in cross section, but of such form as will create the best seat for the air-tube, since the rim can be rolled out and the depressions formed at the same time. Similarly the rings 6. 6. can be rolled out in long strips and then cut into suitable lengths. The engagement of the envelope with the rim is readily effected, when the subsequent inflation of the tire interlocks said rim and cover and these parts are held together as an entirety. In securing the bands or rings 6. 6. longitudinally along the edges of the envelope, the latter may be molded about said rings, or some positive mechanical device, as rivets, or other fastening implements may be employed. In some instances in order to avoid the knobs on the surface of the rim created by forming the depressions 7. 7. and thereby allow such surface to remain smooth as is usual, I have turned the edges of the rim inwardly upon itself, as shown in Fig. 5 previously creating the depressions in this overlapping portion. This construction serves to strengthen and stiffen the rim.

What I claim is—

1. A rim for bicycle tires consisting of a metallic band, semi-circular or otherwise in cross-section, having its concave surface as an outer periphery and its convex surface as the inner periphery and provided with a series of similarly shaped depressions formed in the material composing the rim upon its concave surface and arranged circumferentially along or near either edge, substantially as and for purposes explained.

2. In pneumatic tires, the combination with an annular band semi-circular in cross-section and provided with a series of depressions integrally upon the concave surface, of an envelope or cover fitted with longitudinal metallic rings formed with prominences, which engage the depressions in the rim, substantially as stated and set forth.

3. A pneumatic tire for bicycles composed of a metallic rim, semi-circular or otherwise in cross-section, and formed with integral depressions in its concave surface, an air-tube seated upon said rim, an envelope or cover fitted with unyielding rings longitudinally upon each edge, and a series of prominences formed integrally and at intervals to engage the depressions in the rim, substantially as described and specified.

In testimony whereof I affix my signature in presence of two witnesses.

FREDK. W. HUESTIS.

Witnesses:
FRANCIS C. STANWOOD,
H. E. LODGE.